(12) United States Patent
Gubo

(10) Patent No.: US 7,479,880 B2
(45) Date of Patent: Jan. 20, 2009

(54) PROCESS FOR THE INTEGRITY CHECK OF LOTS OF INDIVIDUAL PACKAGE UNITS

(76) Inventor: Adalbert Gubo, Frauenlobstrasse 55, Mainz (DE) 55118

( * ) Notice: Subject to any disclaimer, the term of this patent is extended or adjusted under 35 U.S.C. 154(b) by 519 days.

(21) Appl. No.: 11/371,293

(22) Filed: Mar. 7, 2006

(65) Prior Publication Data

US 2006/0206714 A1 Sep. 14, 2006

(30) Foreign Application Priority Data

Mar. 8, 2005 (EP) .................................. 05005022

(51) Int. Cl.
*G08B 13/14* (2006.01)
(52) U.S. Cl. ..................... 340/572.1; 726/35; 380/29
(58) Field of Classification Search ............. 340/572.1; 235/385; 707/E17.036; 726/30; 380/29
See application file for complete search history.

(56) References Cited

U.S. PATENT DOCUMENTS

| | | | |
|---|---|---|---|
| 6,496,806 | B1 | 12/2002 | Horwitz et al. |
| 7,348,886 | B2 * | 3/2008 | Himberger et al. ........ 340/572.1 |
| 7,395,963 | B2 * | 7/2008 | Silverbrook et al. ......... 235/385 |
| 2005/0190914 | A1 * | 9/2005 | Chen et al. ................... 380/201 |
| 2005/0252970 | A1 * | 11/2005 | Howarth et al. ............. 235/451 |
| 2006/0101067 | A1 * | 5/2006 | Kilian-Kehr et al. .... 707/103 R |
| 2006/0286569 | A1 * | 12/2006 | Bar-Or et al. ................... 435/6 |
| 2007/0120651 | A1 * | 5/2007 | Kobayashi et al. ........ 340/10.51 |
| 2007/0235724 | A1 * | 10/2007 | Wu et al. ....................... 257/40 |
| 2007/0238851 | A1 * | 10/2007 | Wu et al. ..................... 528/373 |

FOREIGN PATENT DOCUMENTS

| | | |
|---|---|---|
| EP | 1 591 952 | 11/2005 |
| WO | WO-2004/114086 | 12/2004 |

\* cited by examiner

*Primary Examiner*—Daniel Wu
*Assistant Examiner*—Bradley E Thompson
(74) *Attorney, Agent, or Firm*—Connolly Bove Lodge & Hutz LLP

(57) ABSTRACT

A process for integrity check of lots of individual package units which comprises combining at least one RFID tag and a container which contains a large number of individual package units wherein each of the individual package units is marked with a marking code, the information of these codes of all individual package units is combined, and a hash code is generated based on the combined information of all marking codes of all individual package units, which combined hash code is stored in an RFID tag which is affixed to the container, this combined hash code together with the individual hash codes for the individual package units being stored in the data base of the SENDER site where the container is packed and sealed, the individual hash codes then being transmitted to the RECIPIENT of the said container, the information collected from the RFID tag being compared to the combined hash code which is calculated at the RECIPIENT site from the information received by the SENDER of the said container including all individual hash codes of all package units in the said container, and to the combined hash code calculated from the markings on the individual package units or boxes scanned at the RECIPIENT site, and the application of the said process in the verification of the integrity of pharmaceutical goods, video information such as movies on DVD, audio information such as music on CD, computer files, or paper documents.

11 Claims, 5 Drawing Sheets

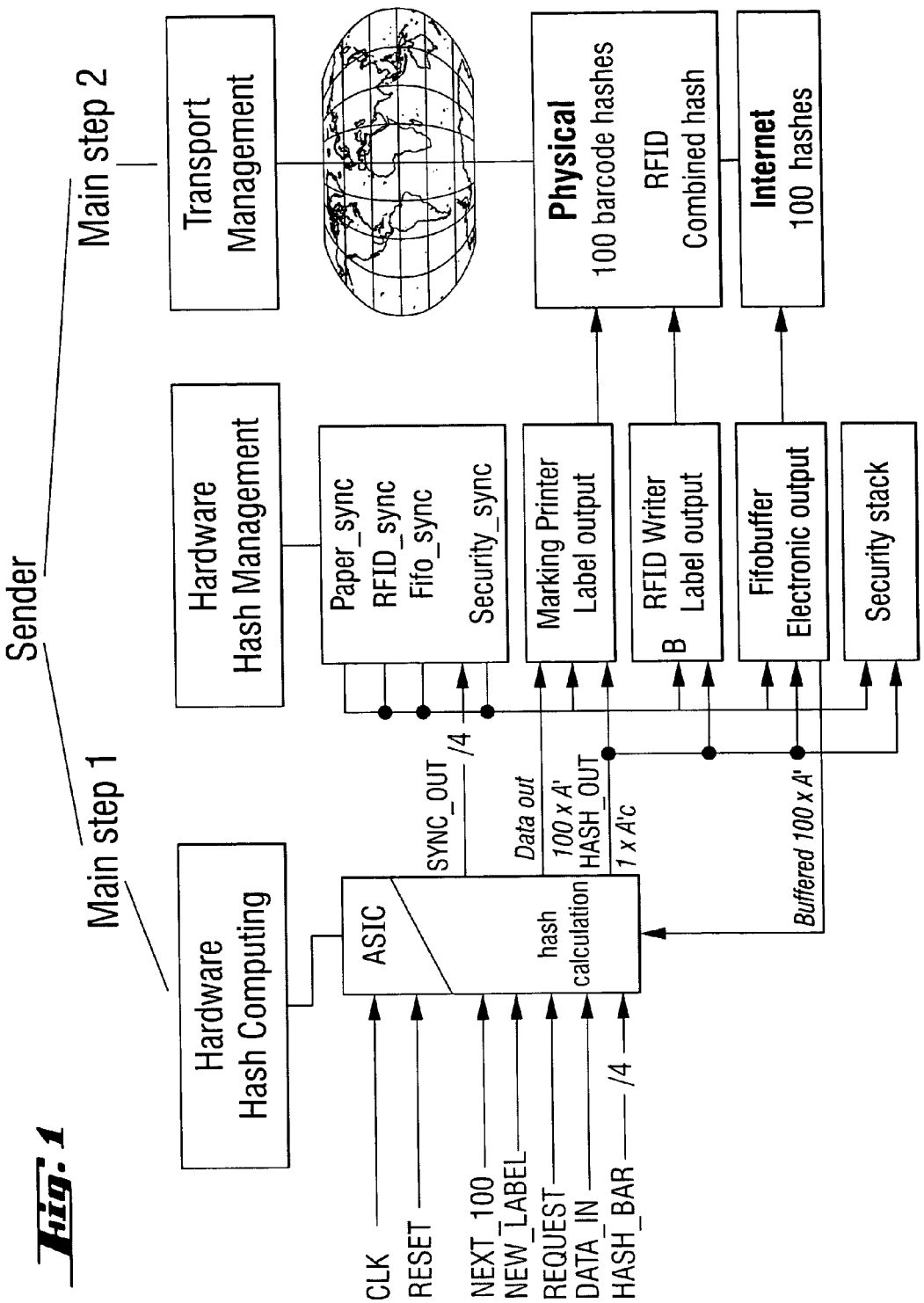

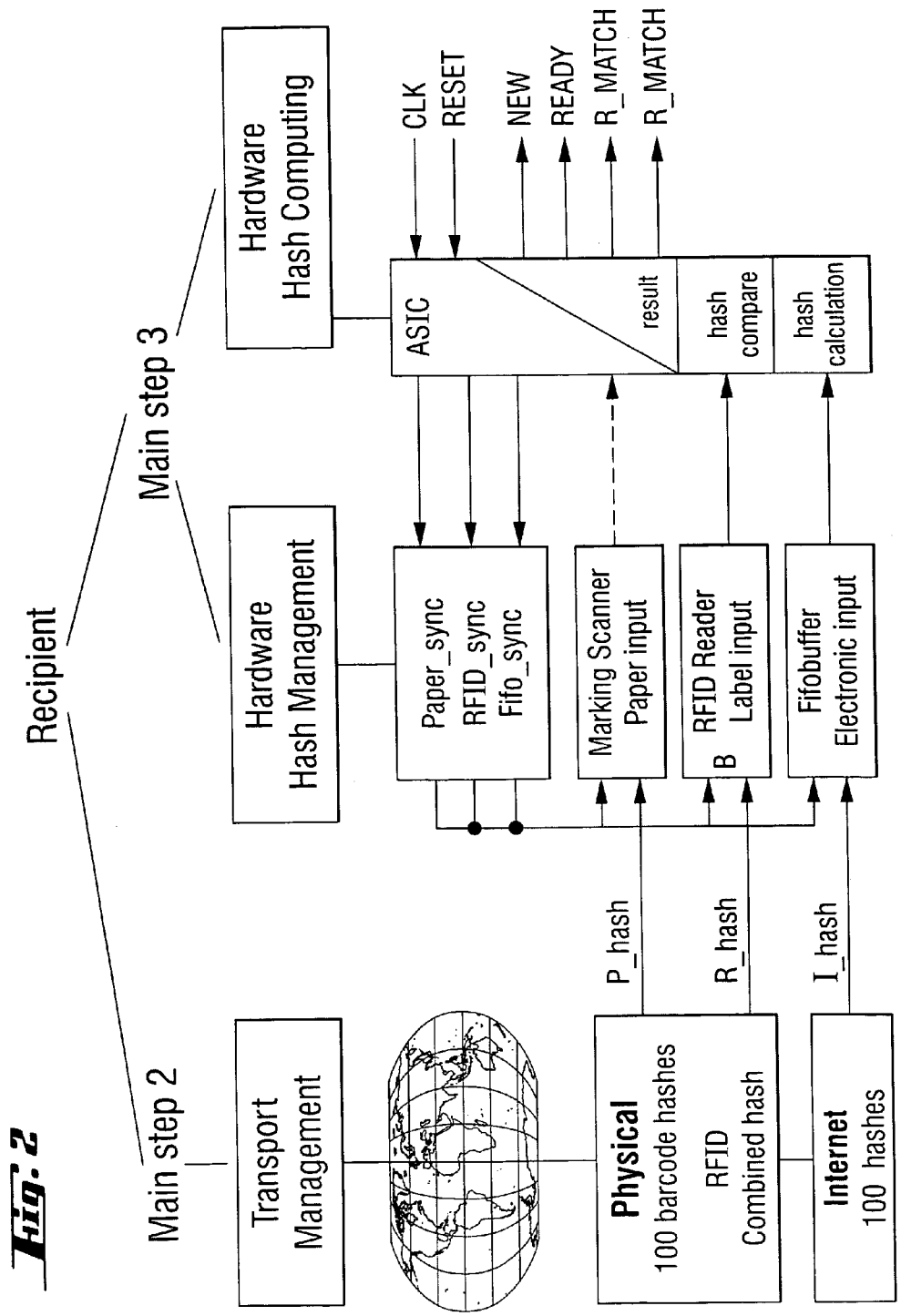

Fig. 3  Signals and their meanings

| Sender | | Recipient | | |
|---|---|---|---|---|
| Input | Output | | Input | Output |
| CLK  global clock | SYNC_OUT  Hash code control bus | | P_hash  Physical readable hash i.e. 100 barcodes | CLK  global clock |
| RESET  global reset | HASH_OUT  Hash code data bus | | R_hash  electronical readable hash i.e. RFID label | RESET  global reset |
| NEXT_100  100 hashes for example | | | I_hash  electronical readable hash i.e. e-mail | NEW  Start of session |
| NEW_LABEL  Start n+1 of 100 hashes | | | | READY  Check done |
| REQUEST  Get n+1 of 100 hashes | | | | R_MATCH  (un)true |
| DATA_IN  Pixel data to be hashed | | | | P_MATCH  (un)true |
| HASH_BAR  4 lines reflecting sync output | | | | |

STEP 1

Aspect 1,2,3 are found in the following sender modules
ASIC, MARKING PRINTER, RFID WRITER Aspect 4 is reflected by the sender signals above
CLK, NEW, REQUEST, DATA_IN, HASH_BAR, SYNC_OUT A' means HASH_OUT

STEP 2
Transport

STEP 3

Aspect 1 is found in the modules
MARKING SCANNER, RFID WRITER

Aspect 2, 3 is found in the modules
ASIC, SYNC_MODULE

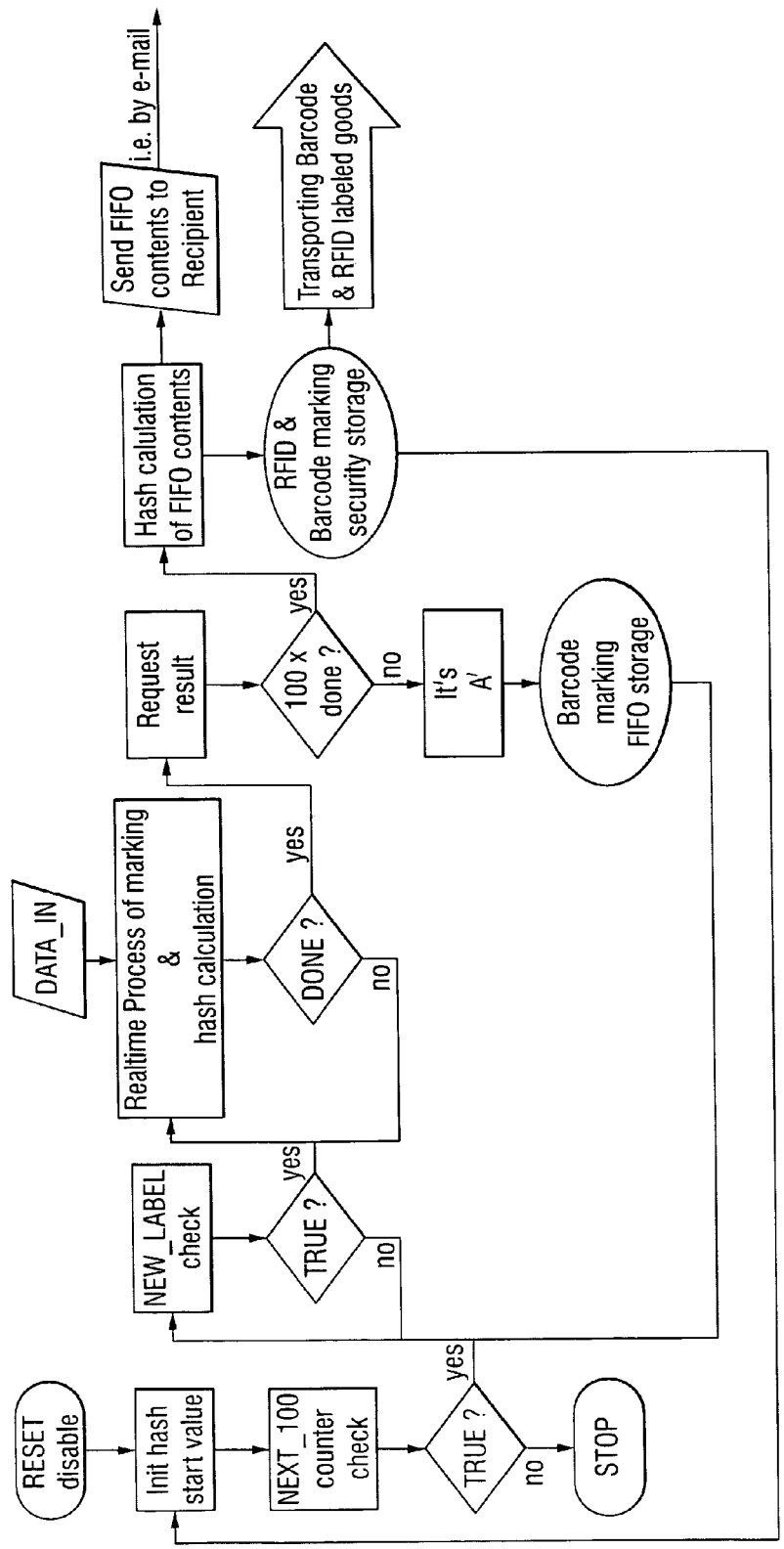

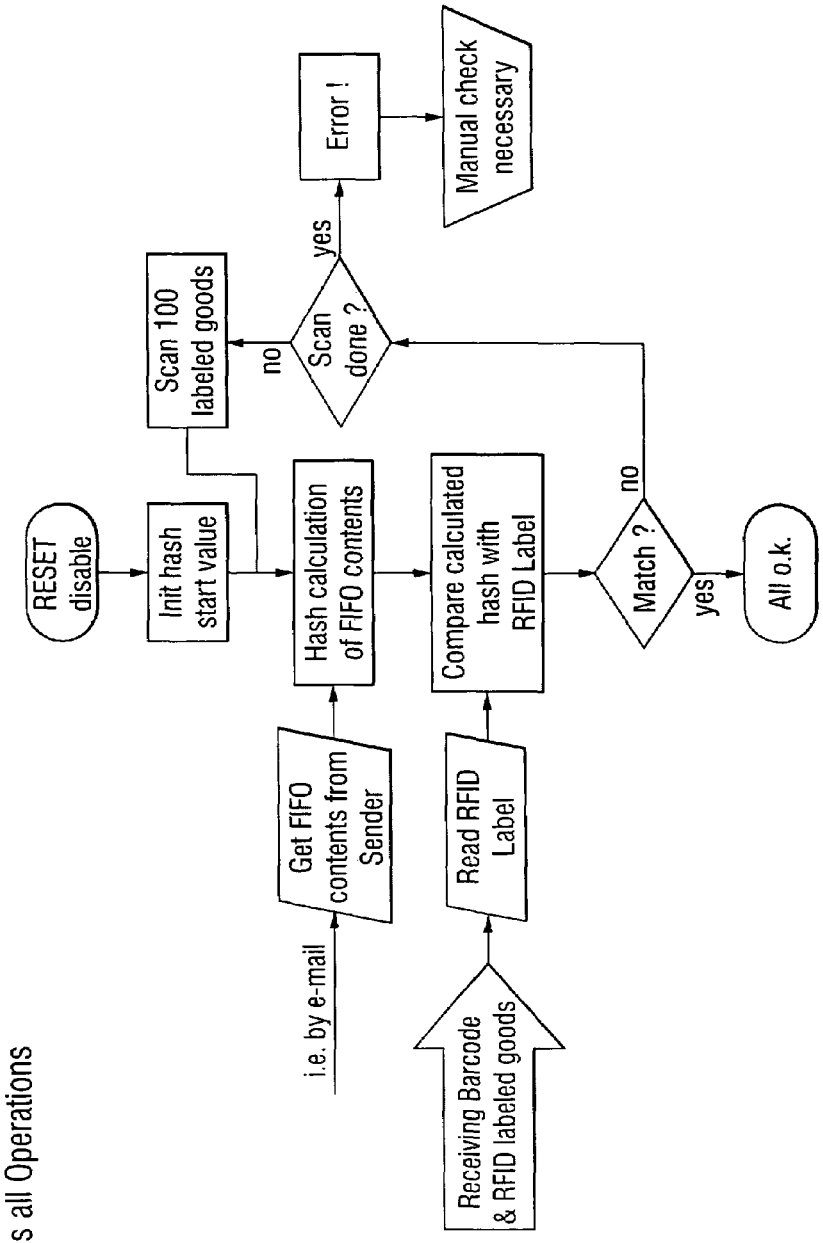

PROCESS FOR THE INTEGRITY CHECK OF LOTS OF INDIVIDUAL PACKAGE UNITS

FIELD OF THE INVENTION

The invention relates to a process for integrity check of lots of individual package units, and to means therefor. Particularly, a process is disclosed which allows to securely identify large numbers of package units which make up the content of a container, or of a shipped lot of the said package units, wherein the individual package units may be identical or different.

BACKGROUND OF THE INVENTION

For the purpose of the present invention, the term "package unit" may also refer to an object, product or item which is not packed in a box or a case nor wrapped in paper as long as the product or item can be marked in such a way that the marking can not be removed without destruction or damaging of the said object. Likewise, a package unit such as a box or case is preferably packed in a way that it cannot be opened to take out the object or product packed therein without destruction or damaging of the said box or case. Whenever reference is made to a box in the present patent application, this shall also include other means of packaging such as cases, or wrappings.

A prerequisite for identification of objects and products is individually marking the objects and products themselves, or their packaging, i.e. boxes. Marking may be made by applying labels to the package unit, or by directly applying the marking to the package unit. A commonly used method is applying bar or dot codes.

Such bar codes may preferably be printed on the box or individual package unit with a device and process fully described in copending European Patent Application 04 009 792.5 which involves generating a combined hash code both from the pixel information sent to the printer, and from the printer-specific information which is collected during the printing operation, the combined information being converted to a hash code by a real time hash engine, i.e. during the process of printing itself. This process make it possible to print the hash code generated during printing of a page at the bottom of that very page. This hash code is preferably printed in the form of a bar code, or a dot pattern which is optically readable. Due to the fact that the hash code is calculated from the pixel information and the printer-specific data, it is comparable to a fingerprint which is unique for any combination of pixel information to be printed, and the specific printer used in the printing process. Any label or any print including this hash code is therefore unique.

Printer-specific information comprises, without limitation, counting the number of revolutions of the light-sensitive drum in a laser printer, irregularities of the rotation of such drum, movement of the mirror in a laser printer, rotation of rubber rolls involved in paper transport, and the movement of printing heads in ink-jet printers, as well as any data generated from the electronic circuitry which drives the printer.

It has also been known that RFID (radio frequency identification) tags may be used to identify products or objects. RFID tags are still expensive, and they also need expensive electronic circuitry to analyse the information within an RFID tag. An advantage of these RFID tags, however, is that they can be read from a distance, i.e. without direct visible contact, and that the amount of information stored may be considerably higher than that of a bar code. On the other hand, simple bar code labels are much cheaper and can be generated faster.

SUMMARY OF THE INVENTION

It is the object of the present invention to provide an inexpensive and yet versatile process which allows to identify a large number of package units which make up a shipped lot, be they identical or different. For the purpose of the explanation given herein, it is considered that the lot is shipped from the SENDER to the RECIPIENT.

This object is achieved by combining at least one RFID tag and a container or otherwise sealed large box which contains a large number of individual boxes or package units. Each of the individual package units is marked with a bar code, preferably a bar code which is unique and generated by the process described supra. Upon assembly of the individual package units to form the contents of a container or other sealed large box, at the SENDER site, the information of the markings, preferably, bar codes, of all individual package units is combined, and a hash code is generated based on the combined information of all markings of all individual package units. This combined hash code is stored in an RFID tag which is affixed to the container. Storage in the RFID tag is done by storing the information in digital form. In a preferred embodiment, the RFID tag is affixed to the container in a way that any tampering with the container, opening, or destroying its integrity will invariably lead to erasing the information in the RFID tag.

At the time of calculation of the said combined hash code, this combined hash code together with the individual hash codes for the individual boxes or package units is stored in the data base of the SENDER site where the container is packed and sealed. The individual hash codes are then transmitted by mail, or by electronic mail, or any other appropriate means of communication to the RECIPIENT of the said container. Upon receipt of the container, the information collected from the RFID tag (combined hash code) is compared to the combined hash code which is calculated at the RECIPIENT site from the information received by the SENDER of the said container and to the combined hash code calculated from the markings on the individual package units or boxes scanned at the RECIPIENT site. As the combined hash code cannot be the same if any of the individual hash codes used in the calculation of the combined hash code are not the same at the SENDER and at the RECIPIENT sites, identity of these hash codes is a proof that the content of the container is the same as at the site of the SENDER.

DETAILED DESCRIPTION OF THE PREFERRED EMBODIMENTS

In a preferred embodiment, the container is made in a special way to ensure that opening or otherwise tampering with the container will result in erasing the information stored in the RFID tag. One simple way of accomplishing this goal is to use a metallic or otherwise conductive container which has an inner sheath also made of metal or another conductive material, and an insulating layer in between. These two conductors form a capacitor which may be part of an oscillatory circuit, or they may form part of the circuitry of the RFID tag itself. Upon damage or opening of the container, the capacity will change, leading to a change in the resonant frequency of the oscillatory circuit, or of the RFID frequency pattern. Another possibility is the generation of an electrical discharge upon opening or damaging the container which will erase the information within the RFID tag.

In the context of the present invention, a container and a package unit need nor necessarily be physical objects; it is also possible to consolidate individual sets of digitally stored information such as data files or picture files or music files which are equivalent to the package units referred to herein, into a container which may be a directory or a directory structure consisting of nested directories comprising the said files, or a physical data storage medium such as a compact disc (CD) or a digital versatile disc (DVD).

According to the invention, the advantages of an RFID tag—storage of large amounts of information, and remote readability, are combined with the advantage of bar or dot code printing which is inexpensive and fast.

According to a preferred embodiment, the information from all markings of the package units making up the contents of the container is combined by computing a hash code from this bar code information, and digitally stored in the RFID tag affixed to the container. As detailed supra, the markings on the package units are made with the process which combines information from the label itself (viz., its pixel code) and information from the printing unit and applied to the exterior of the package units at the same time using a real time hash code generating unit. These markings are unique to each individual package unit.

The security needed for shipping of such containers comprising a large number of individual package units does not require the information which of the individual package units has been removed or replaced, it suffices to be able to tell whether the content of the container at the time of shipment, leaving the SENDER, and at the time of receipt by the RECIPIENT was identical. This statement can unequivocally be made with the process of the invention.

Using the individual hash codes of the individual package units which are marked thereon and those that have been sent to the recipient by e-mail or other means of electronic data communication, it can also be found out in a simple and straightforward manner which of the individual package units is missing or defective.

The process of the invention is illustrated by an example where one hundred individual package units are combined to form the content of a container.

The process comprises these essential steps:

1 Marking the 100 individual boxes by printing on their surface both the pixel information making up the layout including lettering and colour coding, and the marking (bar or dot code) generated by a real time hash engine from the pixel information and information collected from the movement of the printer itself, at the time of printing, as detailed infra, at the site of the SENDER, 2 Calculation of a combined hash code from the hash codes of all 100 individual package units, digitally storing this combined hash code in an RFID tag which is affixed to the container upon collecting all individual package units therein, and optionally, sealing the container in a way that makes sure that the information in the RFID tag is altered or erased by opening or damaging the container, and at the same time transmitting, in a physically separated way, at least one of either all individual hash codes of each of the 100 package units, or this combined hash code, to the RECIPIENT, 3 Shipping of the container with the RFID affixed to it to the RECIPIENT, and 4 Verification of the identity of the combined hash codes, one having been transmitted from the SENDER to the RECIPIENT, or having been calculated at the RECIPIENT site from the individual hash codes which have been transmitted from the SENDER to the RECIPIENT, or both of these alternatives, and the other having been read from the RFID tag at the RECIPIENT site.

The first step is, of course, the most important step, and is conducted in the following manner:

collecting the pixel information generated during printing of the marking of the individual boxes, and transforming this sequential information into a code which has a one-to-one relationship to the sequential pixel information, and computing, in a hardware hash engine, from this marking code and the physical information collected during the actual printing process from mechanical movement and electronic circuitry of the printer, a hashcode which meets the requirements of a digital signature, and then feeding the digital information needed to print the hashcode to the printer, in a pixel format, during the printing process of the page or box label just being printed, or feeding the same hashcode to a digital media storage device, in both cases in a part of the printed page or label, preferably the bottom part of the page or label, which is digitally stored and/or printed.

The algorithm used to generate the hashcode is such that the whole page, in other words, the whole code used in printing of the page or label, is the basis for computation of the hashcode. Additionally, additional information collected during the printing process from the mechanical parts or the electronic circuitry, or both, of the printer is used together with code making up the page or label as the basis for the generation of the hashcode using a fast processor with a high sampling rate, referred to herein as realtime hardware hash engine. The use of present-day fast digital processors makes it possible to generate the hashcode during the printing process in realtime, and to add this hashcode in an appropriate format, preferably a pixel format, to the last part of the page or label just printed, usually the bottom section of the said page or label.

If this step 1 is not conducted according to the process detailed supra, there is no possibility that the verification or comparison step 4 leads to an unequivocal result. This is explained below:

Marking according to the process of step 1 is performed at the same time, with a realtime hardware hash engine, on a physical data storage medium, or data carrier, such as paper or cardboard or overwrap film, and by storing in an electronic storage medium, such as a magnetic disc or optical disc or flash storage. As marking the physical data storage medium and storing the same information are done at the same time, and using the same information, the information in both is the same, and the representations are congruent. It is therefore of no importance here in which way the information is stored, this may be in the form of dots, pixels or bars, using different colours, on paper, cardboard or film, or in the form of differently magnetised magnetic domains on magnetic storage media.

Performing the marking and the storage of the same information at the same time, using a realtime hardware hash engine, comprises several single aspects, only the combination and cooperation of which leads to the unequivocalness of the marking.

The first aspect is the information which is stored both on the physical data carrier, preferably in printed form, but possibly also punched or engraved, and on the electronic data storage medium.

The second aspect is the simultaneity of the marking irrespective of the carrier of this marking information, which is also irrespective of the fact whether this same information is stored as dots on paper, or as bits on an electronic (magnetic, optic, or other) storage medium. While the representation of the information may be in different form, the information itself is the same.

The third aspect is the fact that the marking and storage is effect on a realtime scale. This means that the duration of such marking and storage according to the second aspect is exactly predictable. Any influence of this process of marking and storing has therefore the same effect both on the marking and the storing of the information, which necessarily implies the identity of the information on both data carriers. There is no possibility, therefore, that the information on the different data carriers might be different, regardless of the way the information is stored, be it a bar code on paper, or a bit pattern or sequence on an electronic storage device.

The fourth aspect relates to the transformation of the information A making up the marking on the page or label by the dynamic process with which it is treated. As has been detailed when explaining the second and third aspects, marking is a time dependent dynamic process whereby the information is processed, and consequently, governed by signals and triggers which are time-dependent. These time dependent signals are a source for the calculation of the hash code. As time constantly changes, no hash code can be generated twice, and each marking has its own hash code generated but once. This hash code is stored on both data carriers, together with the information as detailed when the first three aspects were explained, and by the very same process of marking or storing.

Further explanation is now limited to the hash code designated A', based on the information A, and the carriers of this hash codes, a physical carrier, and an electronic carrier.

The simultaneous process of step 1, including the four aspects detailed supra, is repeated one hundred times in our example. This means that one hundred different hash codes are calculated and stored, both electronically, as A'001 to A'100, and in print form, on each of the one hundred boxes.

From these one hundred hash codes, a concatenated, or combined, second generation hash code A'cc is calculated using a defined hash algorithm in the second step, and stored, electronically within, and optionally, in print form on, the RFID tag. This RFID tag is affixed to a container that preferably comprises a means to indicate any tampering with the said container, such as a capacitor which is at least partially discharged by opening the container, which discharge leads to modification or erasure of the information stored in the RFID tag. A copy of at least one of, in the first alternative, all of the electronically stored individual hash codes A'001 to A'100 and, in the other alternative, of the second generation hash code A'cc, or both, is transmitted to the RECIPIENT, by electronic mail or other suitable means.

In a preferred embodiment, marking of the individual package units comprises a printed label or a printed box cover and a hash code calculated from the pixel information on the label or box cover, and printer specific data generated during the printing process using a real time hash engine, which hash code is printed on the label or box cover in the form of a bar or dot code.

In a further preferred embodiment, both the combined hash code and the individual hash codes are transmitted from the SENDER to the RECIPIENT.

In a further preferred embodiment, the combined hash code read from the RFID tag is compared to the combined hash code transmitted from the SENDER to the RECIPIENT.

In a further preferred embodiment, all individual hash codes from all package units in the container are compared to all individual hash codes transmitted from the SENDER to the RECIPIENT.

In a further preferred embodiment, the RFID tag carries information comprising the combined hash code both in electronic form and in print form.

In a further preferred embodiment, the package units comprise digitally stored information selected from the group consisting of digital files, digital audio information, and digital video information.

In a further preferred embodiment, during the generation of the package unit, or the labels affixed to it, or the printed box comprising the package unit, additional information is included in the generation of the individual hash code which additional information comprises a licence key individual to the RECIPIENT.

In a further preferred embodiment, the RFID tag comprises printed electric circuitry printed with electrically conductive toner or ink.

In a further preferred embodiment, the RFID tag comprises printed electronic components selected from the group consisting of active and passive components printed with electrically conductive toner or ink.

In a further preferred embodiment, the electrically conductive toner or ink comprises electrically conductive polymers doped to exhibit p or n conduction.

In a further preferred embodiment, printing on the RFID tag may also comprise printing of the chip itself or the antenna, or both, using an electrically conductive ink or toner. Such electrically conductive ink or toner particles comprise electrically conductive polymers or solutions thereof such as those based on polythiophene or polyacetylene. Using high resolution printing with inks or toner particles comprising different polymers or polymer solutions that are doped in a different way can even be used to print digital information.

Step 3 comprises the shipment, to the RECIPIENT, of the container which comprises the one hundred boxes which are physically marked by printing on the cardboard boxes themselves (page) or by labels affixed to the boxes.

Step 4 comprises reading, at the RECIPIENT, the concatenated, or combined, second generation hash code from the RFID tag, and comparing this code to at least one of, in the first alternative, a hash code calculated at the RECIPIENT site using the same algorithm, from all of the electronically stored individual hash codes A'001 to A'100 and, in the other alternative, of the second generation hash code A'cc. Only if the comparison yields the same value, it is established that the contents of the container at the recipient is identical to the contents when the container was loaded. If there is a discrepancy, of if the container is damaged, all individual hash codes which have been marked on the individual boxes are read, and a second generation hash code is calculated from these individual hash codes. If the individual hash codes read from the boxes and the calculated concatenated second generation hash code coincide with the values transmitted to the recipient by the supplier, this means that only the container has been damaged, but all individual boxes have arrived.

DESCRIPTION OF THE DRAWINGS

The individual steps and signal used therein are detailed in the figures.

FIG. 1 shows the process blocks and the signals fed into the individual processing units at the SENDER site, FIG. 2 shows the process blocks and the signals fed into the individual processing units at the RECIPIENT site, FIG. 3 lists the designation and explanation of the signals, FIG. 4 shows a flowchart of the basic steps performed at the SENDER site, and FIG. 5 shows a flowchart of the basis steps performed at the RECIPIENT site.

In FIG. 1, it is shown in the leftmost block how the hash codes are generated from the data for marking the individual package units, by means of an ASIC. These hash codes are combined with printer specific data such as sync signals and fed during the actual printing process to the Marking Printer, for label output. A second generation, or combined hash code is also calculated in the ASIC from all hash codes generated during the printing process for the individual labels of all individual package units, which hash codes are all individually printed on the labels, in the form of a bar or dot code. The same information is also fed to an RFID writer which writes the second generation hash code in electronically stored from, and optionally, also in the form of a bar or dot code. A FIFO buffer collects the individual hash code information for all of the one hundred package units that make up the shipped lot, and transmits these by e-mail or other appropriate means to the RECIPIENT. A synchronisation unit ensures that the individual operations performed by the printer, the RFID writer, and the FIFO buffer always refer to the same individual package unit, or ensemble of package units. The transport management block takes care of aligning shipping of the container comprising the package units having marked thereon the bar code or dot code hashes, the container being marked with the RFID tag, and the information comprising the hash codes of the individual package units shipped, to the proper RECIPIENT.

In FIG. 2, it is shown how the transport management block delivers to the RECIPIENT in a congruent manner, both the individual bar or dot code hashes, and the combined or second generation has code in the RFID tag which is affixed to the container, and ensures that this block of information is correctly linked to the set of hash codes transmitted in an appropriate manner such as by e-mail or internet. This may be done, e.g. by downloading the hash information from the web site of the SENDER after entering a code communicated in a letter announcing the shipment of the container. In the Hardware Hash Management Unit at the RECIPIENT site, information is collected from the RFID tag, from the individual hash codes of the package units, as communicated by SENDER, or scanned from the individual package units. This information is fed to the Hardware Hash Computing block where calculation of the second generation combined hash and comparison is performed, and a result indicating whether there is a match or not is generated.

FIG. 3 is a condensed explanation of the meaning of signals and the attribution of these signals to the steps as detailed supra.

The logical steps involved in the layout of the sequence and hierarchy of steps performed at the SENDER and at the RECIPIENT site are detailed in FIGS. 4 and 5.

The process as fully described herein provides an efficient method for the integrity check of lots of package units which allows both a simple summary check whether the contents of a container are identical at the SENDER and RECIPIENT site, and to determine which individual package unit is missing or has been destroyed or tampered with during transport.

This process is especially suitable for shipped lots of pharmaceutical goods, video information such as movies on DVD, audio information such as music on CD, computer files, or paper documents.

The invention claimed is:

1. A process for integrity check of lots of individual package units which comprises combining at least one RFID tag and a container which contains a large number of individual package units wherein each of the individual package units is marked with a marking code, the information of these codes of all individual package units is combined, and a hash code is generated based on the combined information of all marking codes of all individual package units, which combined hash code is stored in an RFID tag which is affixed to the container, this combined hash code together with the individual hash codes for the individual package units being stored in the data base of the SENDER site where the container is packed and sealed, the individual hash codes then being transmitted to the RECIPIENT of the said container, the information collected from the RFID tag being compared to the combined hash code which is calculated at the RECIPIENT site from the information received by the SENDER of the said container including all individual hash codes of all package units in the said container, and to the combined hash code calculated from the markings on the individual package units or boxes scanned at the RECIPIENT site.

2. The process of claim 1 wherein the marking of the individual package units comprises a printed label or a printed box cover and a hash code calculated from the pixel information on the label or box cover, and printer specific data generated during the printing process using a real time hash engine, which hash code is printed on the label or box cover in the form of a bar or dot code.

3. The process of claim 1 wherein the both the combined hash code and the individual hash codes are transmitted from the SENDER to the RECIPIENT.

4. The process of claim 3 wherein the combined hash code read from the RFID tag is compared to the combined hash code transmitted from the SENDER to the RECIPIENT.

5. The process of claim 1 wherein all individual hash codes from all package units in the container are compared to all individual hash codes transmitted from the SENDER to the RECIPIENT.

6. The process of claim 1 wherein the RFID tag carries information comprising the combined hash code both in electronic form and in print form.

7. The process of claim 1 wherein the package units comprise digitally stored information selected from the group consisting of digital files, digital audio information, and digital video information.

8. The process of claim 7 wherein during the generation of the package unit, or the labels affixed to it, or the printed box comprising the package unit, additional information is included in the generation of the individual hash code which additional information comprises a licence key individual to the RECIPIENT.

9. The process of claim 1 wherein the RFID tag comprises printed electric circuitry printed with electrically conductive toner or ink.

10. The process of claim 1 wherein the RFID tag comprises printed electronic components selected from the group consisting of active and passive components printed with electrically conductive toner or ink.

11. The process of claim 10 wherein the electrically conductive toner or ink comprises electrically conductive polymers doped to exhibit p or n conduction.

* * * * *